US011736591B2

(12) United States Patent
Schnieders

(10) Patent No.: US 11,736,591 B2
(45) Date of Patent: Aug. 22, 2023

(54) METHOD FOR OPERATING A DISTRIBUTED APPLICATION

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/840,640

(22) Filed: Jun. 15, 2022

(65) Prior Publication Data

US 2022/0407944 A1 Dec. 22, 2022

(30) Foreign Application Priority Data

Jun. 17, 2021 (EP) ..................................... 21180179

(51) Int. Cl.
*H04L 67/61* (2022.01)
*H04L 67/10* (2022.01)

(52) U.S. Cl.
CPC .............. *H04L 67/61* (2022.05); *H04L 67/10* (2013.01)

(58) Field of Classification Search
CPC ................................ H04L 67/10; H04L 67/51
See application file for complete search history.

(56) References Cited

U.S. PATENT DOCUMENTS

| | | | |
|---|---|---|---|
| 10,811,771 B1* | 10/2020 | Tran ........................ | H01Q 19/09 |
| 2004/0181811 A1* | 9/2004 | Rakib .................... | H04L 9/0894 |
| | | | 725/111 |
| 2011/0142015 A1 | 6/2011 | Shaikh et al. | |
| 2012/0297371 A1* | 11/2012 | Greifeneder ........ | G06F 11/3495 |
| | | | 717/128 |
| 2014/0036666 A1 | 2/2014 | Seiji et al. | |
| 2014/0189808 A1* | 7/2014 | Mahaffey ................ | G06F 21/31 |
| | | | 726/4 |
| 2017/0018042 A1* | 1/2017 | Pudipeddi .......... | G06Q 30/0255 |

* cited by examiner

*Primary Examiner* — El Hadji M Sall
(74) *Attorney, Agent, or Firm* — Leydig, Voit & Mayer, Ltd.

(57) ABSTRACT

A method for operating a distributed application includes: transmitting, by an application frontend of the distributed application, upon a launch of the application frontend, an initialization request to a registration server via a communication network; selecting, by the registration server, upon receipt of the initialization request, an instance of an application backend of the distributed application and transmitting an IP address of the selected instance to the application frontend; transmitting, by the application frontend, upon receipt of the IP address, application data to the transmitted IP address via a connection provided by the communication network; selecting, by a core server of the communication network, upon transmission of the application data, a quality service for the distributed application; applying, by the communication network, a service quality determined by the selected quality service to the connection; and operating the distributed application with the applied service quality.

12 Claims, 1 Drawing Sheet

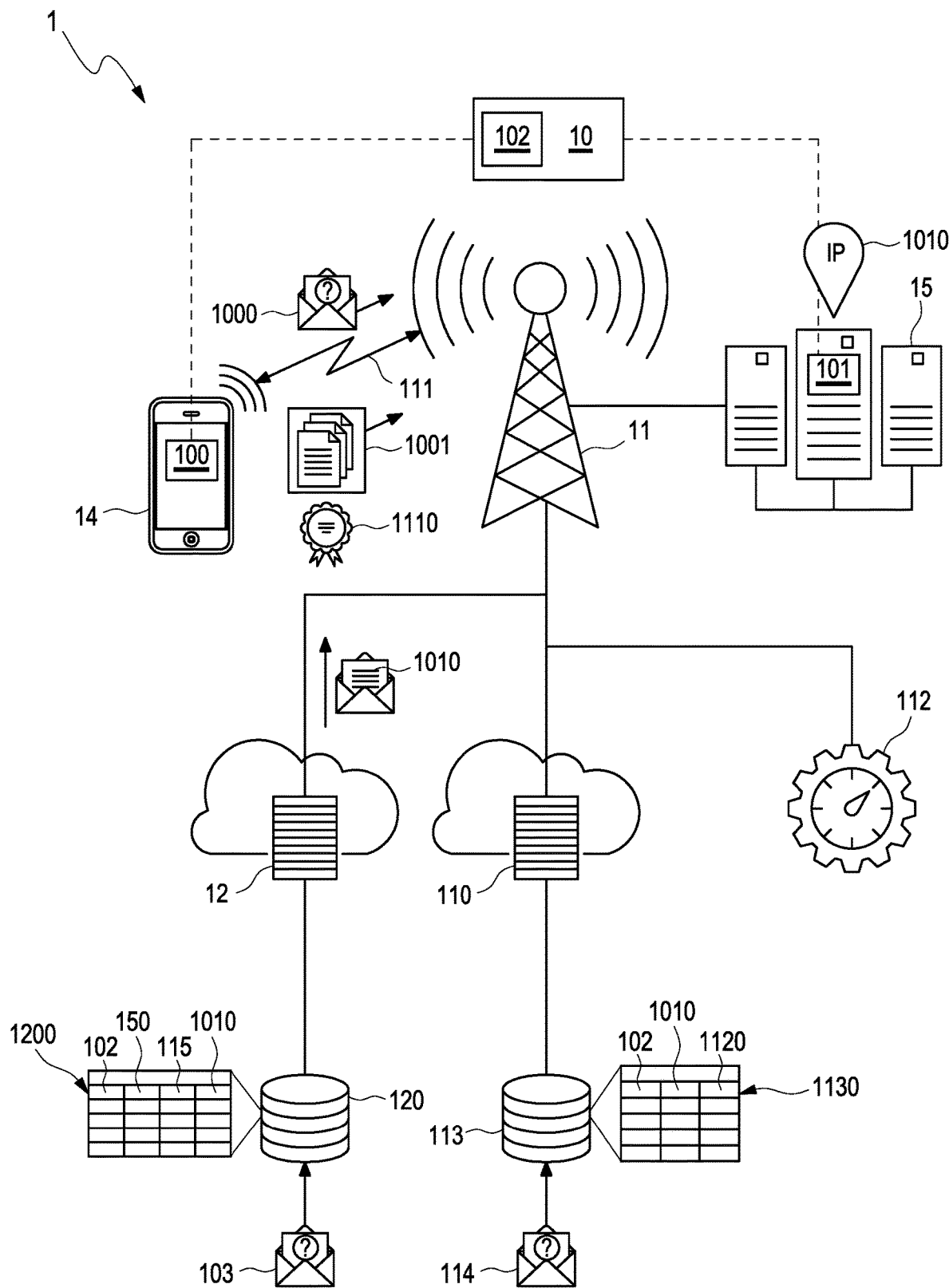

METHOD FOR OPERATING A DISTRIBUTED APPLICATION

CROSS-REFERENCE TO PRIOR APPLICATIONS

This application claims benefit to European Patent Application No. EP 21 180 179.0, filed on Jun. 17, 2021, which is hereby incorporated by reference herein.

FIELD

The invention relates to a method for operating a distributed application, wherein an application frontend of the distributed application transmits application data to an IP address of an application backend of the distributed application via a connection provided by a communication network, the communication network applies a service quality to the communication connection and the distributed application is operated with the applied service quality. Furthermore, the invention relates to a core server for a communication network, a registration server for a distributed application, a distributed application and a system for operating a distributed application.

BACKGROUND

A distributed application generally comprises an application backend to be executed by a backend server which, therefore, may also be referred to as an application server and at least one application frontend to be usually executed by a terminal device being arranged remote from the backend server wherein the application backend and the application frontend are configured to communicate with each other via a communication network while being executed. The terminal device may also be referred to as an application client.

ADAS (Advanced Driver Assistance System), AR (Augmented Reality)-applications and VR (Virtual Reality)-applications configured for rendering remotely and streaming, respectively, Computer Vision Algorithms for industrial robots, vehicles or drones are important examples of modern distributed applications.

Such a modern distributed application requires the application backend and the application frontend thereof to be executed with a latency as low as possible for working properly. However, the latency may be and generally is adversely affected by a so-called jitter which is essentially caused by a communication connection provided by the communication network and connects the application backend and the application frontend with each other, i.e. a communication delay statistically varying over time.

As a consequence, the modern distributed application requires a maximum latency of the communication network to be sufficiently low. The lower the maximum latency of the communication connection is, the lower the possible jitter thereof and the more stable the latency will be allowing the distributed application to work more properly. It is noted that a stability of the latency, herein, means practically negligible statistical variations of the latency over time and, hence, a very high synchronicity of the application frontend and the application backend, i.e. a highly synchronous execution of the distributed application.

The maximum latency usually corresponds to a service quality, e.g. quality of service (QoS), provided by a quality service of the communication network, i.e. a service of the communication network assigning a respective service quality to each communication connection and providing the communication connection therewith.

In a practically relevant constellation, a large plurality of different terminal devices at the same time executes a large plurality of application frontends of a large plurality of different distributed applications some of which require a very low and stable latency and some of which do not.

Accordingly, the communication network at any instant has to identify each distributed application requiring a very low and stable latency for applying an adequate, i.e. a sufficient, service quality to the communication connection used thereby, as precisely as possible.

However, methods based on an APN (access point name), an application ID or an address of the distributed application, e.g. a triple comprising an IP address of the application backend, a port number for communication and an application protocol used by the distributed application, have been proven to either require a very high effort for implementation, not to provide a sufficient security, not to be compatible with an encryption of the communication connection or to suffer from port numbers varying during operation of the distributed application, to name only few practical problems.

Apart from that, none of the above-mentioned methods provides sufficient precision in telling apart distributed applications requiring a low and stable latency from distributed applications without that requirement.

SUMMARY

In an exemplary embodiment, the present invention provides a method for operating a distributed application. The method includes: transmitting, by an application frontend of the distributed application, upon a launch of the application frontend, an initialization request to a registration server via a communication network; selecting, by the registration server, upon receipt of the initialization request, an instance of an application backend of the distributed application and transmitting an IP address of the selected instance to the application frontend; transmitting, by the application frontend, upon receipt of the IP address, application data to the transmitted IP address via a connection provided by the communication network; selecting, by a core server of the communication network, upon transmission of the application data, a quality service for the distributed application; applying, by the communication network, a service quality determined by the selected quality service to the connection; and operating the distributed application with the applied service quality.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows an entity diagram of a system according to the invention for operating a distributed application.

DETAILED DESCRIPTION

Exemplary embodiments of the invention provide a method for operating a distributed application which provides a simple, universal, secure and reliable support for executing a distributed application requiring a very low and stable latency. Further exemplary embodiments of the invention provide a core server for a communication network, a registration server for a distributed application, a distributed application and a system for operating a distributed application, respectively.

A first aspect of the invention is a method for operating a distributed application, wherein an application frontend of a distributed application transmits application data to an IP address of an application backend of the distributed application via a connection provided by a communication network, the communication network applies a service quality to the communication connection, and the distributed application is operated with the applied service quality. Systems comprising a communication network and distributed applications using the communication network for a communication between respective application backends and application frontends are very common. The application backend may be installed on a backend server, i.e. an application server, while the application frontend may be installed on a terminal device, i.e. an application client. Thus, the invention may be applied to many systems.

According to the invention, the application frontend of the distributed application, upon a launch of the application frontend, transmits an initialization request to a registration server via a communication network, the registration server, upon receipt of the initialization request, selects an instance of the application backend of the distributed application and transmits an IP address of the selected instance to the application frontend, the application frontend, upon receipt of the IP address, transmits application data to the transmitted IP address via a connection provided by the communication network, a core server of the communication network, upon transmission of the application data, selects a quality service for the distributed application, the communication network applies a service quality determined by the selected quality service to the communication connection and the distributed application is operated with the applied service quality. Shortly summarized, the operation of the distributed application according to an exemplary embodiment comprises two phases, an initialization phase and a subsequent normal operation phase.

The initialization phase includes a communication of the application frontend with the registration server and results in assigning an adequate application backend instance to the application frontend. The adequate application backend is identified by its IP address. The initialization phase, in particular the registration server, provides the method with a high security as only registered distributed applications will be operated according to the method. Additionally, the initialization phase allows for minimizing a round trip time (RTT) seen by the distributed application by selecting an instance of the application backend located close to the application frontend.

The normal operation phase includes transmitting application data between the application frontend and the assigned application backend. It is noted that, the transmission of the application data which necessarily depends on public IP addresses or private IP addresses enables the communication network, more precisely a selected quality service of the communication network, to identify the communication connection used by the distributed application and to apply the service quality to the identified communication connection.

The communication network may comprise one or more than one quality service, i.e. one or more than one network service configured for managing service qualities, e.g. respective qualities of service (QoS), of communication connections. Particularly, the communication network may comprise at least two quality services indeed different from each other, but still able to manage service qualities of the communication connections.

In an embodiment, selecting the instance of the application backend comprises retrieving the IP address from an application registration database. The registration database comprises a plurality of entries each of which at least comprises an IP address of an instance of the application backend of the distributed application. The IP address, hence, is used as an identifier of the instance of the application backend to be assigned to the application frontend. Generally, when there is a plurality of different instances of the application backend, the application registration database comprises a corresponding plurality of entries to select from.

Preferably, retrieving the IP address comprises comparing an application ID transmitted by the application frontend with a plurality of entries in the application registration database, each entry comprising an application ID of a distributed application, data related to an edge data center providing the application backend, data related to a communication network connected to the edge data center and an IP address of the provided application backend, and selecting an entry matching the application ID and the communication network and retrieving the IP address of the selected entry. The application ID uniquely identifies the distributed application, i.e. each instance of the application frontend or the application backend of the distributed application.

Edge data centers allow for very small round trip times and, hence, are particularly adequate for the application backend, i.e. for hosting and executing an instance of the application backend. The data related to the edge data center may comprise a location of the edge data center, a capacity of the edge data center etc. Of course, different edge data centers may be connected to by different communication networks. First, a single country usually has a plurality of different communication networks. Second, different countries usually have different communication networks. Accordingly, the method supports edge data centers located in different countries, in particular different continents, and connected to by different communication networks. The method is not limited by a location of the edge data center or a communication network connecting the edge data center.

The entry is preferably selected depending on a spatial location of a terminal device executing the application frontend, a spatial location, a logical location, a capacity and/or a load of the edge data center and/or a topology or a load of the communication network connected to the edge data center. Each of the listed criteria supports selecting an optimal edge data center for the requesting application frontend. For instance, when a smartphone as the terminal device is located in a radio cell of a cellular network, an edge data center directly associated with the radio cell may be selected.

Each entry in the application registration database may be created in advance upon an application registration request. Ideally, an application provider providing the distributed application, in advance, registers the distributed application and preferred edge data centers for the distributed application via the application registration request and provides an instance of the application frontend in each registered edge data center before the distributed application is executed for the first time. However, the application provider, even after the first execution of the distributed application, may readily register or install further edge data centers for the distributed application.

In favorable embodiments, each IP address is exclusively associated both with the edge data center and with the application ID. In other words, there is one and only one instance of the application backend to be addressed via the IP address. Of course, the one and only one instance of the application backend located at a particular IP address may be connected to by a plurality of different application frontends simultaneously. Apart from that, more than one IP address may be associated both with the edge data center and with the application ID enabling the distributed application for providing more than one instance of the application backend at the edge data center simultaneously.

Selecting the quality service advantageously comprises retrieving data related to the quality service from a quality booking database. The quality booking database comprises one or more than one quality service for applying the service quality to the communication connection used by the distributed application.

In advantageous embodiments, retrieving the data related to the quality service comprises comparing the IP address of the transmitted application data and an application ID transmitted by the application frontend with a plurality of entries in the quality booking database, each entry comprising an application ID, an IP address and data related to a service quality, and selecting an entry matching the IP address of the transmitted application data and the transmitted application ID and retrieving the data related to the service quality of the selected entry as the data related to the quality service. The data related to a service quality comprises, for instance, configuration parameters for the quality service wherein the configuration parameters allow for causing the quality service to apply the service quality to the communication connection.

A core server of the communication network may configure the quality service depending on the data related thereto, the data indicating a type of the quality service and/or a configuration parameter for the quality service. The core server may particularly configure select a scheduler of the communication network as the quality service and apply the data to the selected scheduler.

Each entry in the quality booking database is preferably created in advance upon an application quality booking request. Ideally, the application provider providing the distributed application, in advance, books a service quality for the distributed application via the quality booking request before the distributed application is executed for the first time. However, the application provider, even after the first execution of the distributed application, may readily book or change the service quality for the distributed application.

In many embodiments, the connection is provided by a radio access network or a wired network as the communication network. Radio access networks (RAN), e.g. cellular networks or wireless local area networks (WLAN), are very common communication networks. The wired network may be configured as an ethernet network or the like.

A second aspect of the invention is a core server for a communication network. As the communication network usually comprises a core server, the core server may be readily upgraded for supporting a method according to an exemplary embodiment.

According to the invention, the core server comprises a quality booking database and being configured for carrying out a method according to an exemplary embodiment together with a registration server according to an exemplary embodiment (see below) and a distributed application according to an exemplary embodiment (see below). The quality booking database allows for booking a service quality for a distributed application in advance.

A third aspect of the invention is a registration server for a distributed application. The registration server allows for registering the distributed application in advance and, thus, increasing a security of the distributed application.

According to the invention, the registration server comprises an application registration database and is configured for carrying out a method together with a core server and a distributed application (see below). The application registration database allows for selecting an adequate optimal edge data center hosting and executing an application backend of the distributed application and, thus, minimizing a round trip time of the communication network seen by the distributed application.

A fourth aspect of the invention is a distributed application, comprising an application frontend to be executed by a terminal device and an application backend to be executed by a backend server remotely from the terminal device and to be connected to via a communication network. The distributed application may require a very low and stable latency. For instance, the distributed application may be an ADAS (Advanced Driver Assistance System), an AR (Augmented Reality)-application or an VR (Virtual Reality)-application configured for rendering remotely and streaming, respectively, or a Computer Vision Algorithm for industrial robots, vehicles or drones and the like.

According to the invention, the distributed application is configured for carrying out a method together with a core server and a registration server. The distributed application is reliably operated with an adequate service quality and, hence, is executed in a very low and stable latency when carrying out the inventive method.

A fifth aspect of the invention is a system for operating a distributed application, comprising a communication network, a quality service and a distributed application. There are many such existing systems which may be readily upgraded for carrying out a method according to an exemplary embodiment.

According to the invention, the system comprises a core server, a registration server and a distributed application. The system simply, universally, securely and reliably supports operating the distributed application or a large number of distributed applications requiring a very low and stable latency.

It is an advantage of the method according to the invention that a simple, universal, secure and reliable support is provided for distributed applications requiring a very low and stable latency. In other words, the method may be carried out by a relatively simple system based on existing components of usual communication networks. Moreover, the method may be carried out using any communication network, i.e. application of the method does not depend on a particular communication network. Rather, the method still works with a plurality of different communication networks at the same time. Finally, the method guarantees a sufficient service quality for any registered distributed application as far as there is an edge data center sufficiently close and running an application backend of the distributed application with respect to a terminal device running an application frontend of the distributed application.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

The invention is described in detail via two exemplary embodiments and with reference to the drawings. Like components are indicated by like reference numerals throughout the drawings.

FIG. 1 schematically shows an entity diagram of a system 1 according to the invention for operating a distributed application 10. The system 1 comprises a communication network 11, a quality service 112, a core server 110 according to the invention, the core server 110 and the quality service 112 usually being part of the communication network 11, a registration server 12 according to the invention and a distributed application 10 according to the invention.

The system 1 may further comprise a terminal device 14, i.e. an application client, for instance a smartphone, to be connected to the communication network 11 and a backend server, i.e. an application server, exemplarily configured as a component of an edge data center 15 connected to the communication network 11.

The core server 110 comprises a quality booking database 113 and is configured for carrying out a method as described below together with the registration server 12 and the distributed application 10.

The registration server 12 comprises an application registration database 120 and is configured for carrying out the method as described below together with the core server 110 and the distributed application 10.

The distributed application 10 comprises an application frontend 100 to be executed by the terminal device 14 and an application backend 101 to be executed by the backend server remotely from the terminal device 14 and to be connected to by the application frontend 100 via the communication network 11. The distributed application 10 is configured for carrying out the method as described below together with the core server 110 and the registration server 12.

The following method is carried out by the system 1 for operating the distributed application 10.

The application frontend 100 of the distributed application 10, upon a launch of the application frontend 100, transmits an initialization request 1000 to the registration server 12 via the communication network 11.

The registration server 12, upon receipt of the initialization request 1000, selects an instance of an application backend 101 of the distributed application 10 and transmits an IP address 1010 of the selected instance to the application frontend 100. Selecting the instance of the application backend 101 preferably comprises retrieving the IP address 1010 from the application registration database 120.

Retrieving the IP address 1010 may comprise comparing an application ID 102 transmitted by the application frontend 100 with a plurality of entries 1200 in the application registration database 120. Each entry 1200 comprises an application ID 102 of a distributed application 10, data 150 related to an edge data center 15 providing the application backend 101, data 115 related to a communication network 11 connected to the edge data center 15 and an IP address 1010 of the provided application backend 101. Retrieving the IP address 110 may further comprise selecting an entry 1200 matching the application ID 102 and the communication network 11 and retrieving the IP address 1010 of the selected entry 1200. Each IP address 1010 may be exclusively associated both with the edge data center 15 and with the application ID 102.

Thereby, the entry 1200 is preferably selected depending on a spatial location of the terminal device 14 executing the application frontend 100, a spatial location, a logical location, a capacity and/or a load of the edge data center 15, particularly a relative location of the terminal device 14 and the edge data center 15, and/or a topology or a load of the communication network 11 connected to the edge data center 15.

Advantageously, each entry 1200 in the application registration database 120 is created in advance upon an application registration request 103, for instance by an application provider.

The application frontend 100, upon receipt of the IP address 1010, transmits application data 1001 to the transmitted IP address 1010 via a connection 111 provided by the communication network 11. The connection 111 is exemplarily provided by a radio access network or by a wired network as the communication network 11.

The core server 110 of the communication network 11, upon transmission of the application data 1001, selects the quality service 112 of the communication network 11 for the distributed application 10. Selecting the quality service 112 comprises retrieving data 1120 related to the quality service 112 from a quality booking database 113.

Retrieving the data 1120 related to the quality service 112 may comprise comparing the IP address 1010 of the transmitted application data 1001 and an application ID 102 transmitted by the application frontend 100 with a plurality of entries 1130 in the quality booking database 113. Each entry 1130 comprises an application ID 102, an IP address 1010 and data 1120 related to the service quality 1110. Retrieving the data 1120 may further comprise selecting an entry 1130 matching the IP address 1010 of the transmitted application data 1001 and the transmitted application ID 102 and retrieving the data 1120 related to the service quality 1110 of the selected entry 1130 as the data related to the quality service 112.

Advantageously, each entry 1130 in the quality booking database 113 is created in advance upon an application quality booking request 114, for instance by the application provider.

The core server 110 of the communication network 11 may configure the quality service 112 depending on the data 1120 related thereto, the data 1120 indicating a type of the quality service 112 and/or a configuration parameter for the quality service 112.

The communication network 11 applies a service quality 1110 determined by the selected quality service 112 to the connection 111.

The distributed application 10 is operated with the applied service quality 1110.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 system
10 distributed application
100 application frontend
1000 initialization request
1001 application data
101 application backend
1010 IP address
102 application ID
103 application registration request
11 communication network
110 core server
111 connection
1110 service quality
112 quality service
1120 data
113 quality booking database
1130 entry
114 quality booking request
115 data
12 registration server
120 application registration database
1200 entry
14 terminal device
15 edge data center
150 data

The invention claimed is:

1. A method for operating a distributed application, comprising:
   transmitting, by an application frontend of the distributed application, upon a launch of the application frontend, an initialization request to a registration server via a communication network;
   selecting, by the registration server, upon receipt of the initialization request, an instance of an application backend of the distributed application and transmitting an IP address of the selected instance to the application frontend;
   transmitting, by the application frontend, upon receipt of the IP address, application data to the transmitted IP address via a connection provided by the communication network;
   selecting, by a core server of the communication network, upon transmission of the application data, a quality service for the distributed application;
   applying, by the communication network, a service quality determined by the selected quality service to the connection; and
   operating the distributed application with the applied service quality.

2. The method according to claim 1, wherein selecting the instance of the application backend comprises retrieving the IP address from an application registration database.

3. The method according to claim 2, wherein retrieving the IP address comprises:
   comparing an application ID transmitted by the application frontend with a plurality of entries in the application registration database, each entry comprising an application ID of a distributed application, data related to an edge data center providing the application backend, data related to a communication network connected to the edge data center, and an IP address of the provided application backend;
   selecting an entry matching the application ID and the communication network; and
   retrieving the IP address of the selected entry.

4. The method according to claim 3, wherein the entry is selected depending on a spatial location of a terminal device executing the application frontend, a spatial location, a logical location, a capacity and/or a load of the edge data center and/or a topology or a load of the communication network connected to the edge data center.

5. The method according to claim 3, wherein each entry in the application registration database is created in advance upon an application registration request.

6. The method according to claim 3, wherein each IP address is exclusively associated both with the edge data center and with the application ID.

7. The method according to claim 1, wherein selecting the quality service comprises retrieving data related to the quality service from a quality booking database.

8. The method according to claim 7, wherein retrieving the data related to the quality service comprises:
   comparing the IP address of the transmitted application data and an application ID transmitted by the application frontend with a plurality of entries in the quality booking database, each entry comprising an application ID, an IP address, and data related to the service quality;
   selecting an entry matching the IP address of the transmitted application data and the transmitted application ID; and
   retrieving the data related to the service quality of the selected entry as the data related to the quality service.

9. The method according to claim 7, wherein the core server of the communication network configures the quality service depending on the data related thereto, the data indicating a type of the quality service and/or a configuration parameter for the quality service.

10. The method according to claim 8, wherein each entry in the quality booking database is created in advance upon an application quality booking request.

11. The method according to claim 1, wherein the connection is provided by a radio access network or a wired network as the communication network.

12. A system for operating a distributed application, comprising:
   the distributed application comprising an application frontend and an application backend;
   a registration server; and
   a communication network comprising a core server;
   wherein the application frontend is configured to transmit, upon a launch of the application frontend, an initialization request to a registration server via a communication network;

wherein the registration server is configured to select, upon receipt of the initialization request, an instance of an application backend of the distributed application and transmit an IP address of the selected instance to the application frontend;

wherein the application frontend is configured to transmit, upon receipt of the IP address, application data to the transmitted IP address via a connection provided by the communication network;

wherein the core server is configured to select, upon transmission of the application data, a quality service for the distributed application;

wherein the communication network is configured to apply a service quality determined by the selected quality service to the connection; and wherein the distributed application is configured to be operated with the applied service quality.

* * * * *